Aug. 9, 1927.　　　　　　　　　　1,638,376
A. TAUB
CLUTCH
Filed Aug. 8, 1924　　2 Sheets-Sheet 1

INVENTOR
Alex Taub
BY
Blackmore, Spencer & Hunt
ATTORNEYS

Aug. 9, 1927.

A. TAUB

CLUTCH

Filed Aug. 8, 1924

INVENTOR
Alex Taub
BY
Blackmore, Spencer & Flint.
ATTORNEYS

Patented Aug. 9, 1927.

1,638,376

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

CLUTCH.

Application filed August 8, 1924. Serial No. 730,866.

This invention relates to clutches, and is illustrated as embodied in an automobile clutch of the single plate type. An object of the invention is to so arrange the parts of a plate or disk clutch that the power for throwing the clutch in is derived from a plurality of relatively weak small springs, and is multiplied by being transmitted through the clutch-operating levers.

Another object of the invention is to simplify and cheapen the construction of the clutch by providing a novel arrangement of the parts such that the clutch springs are utilized to connect the lever-operating member and the supporting member on the flywheel against which the levers react in throwing in the clutch. The details and advantages of this arrangement will be apparent from the following description of the illustrative embodiment of the invention shown in the accompanying drawings, in which.

Figure 1:
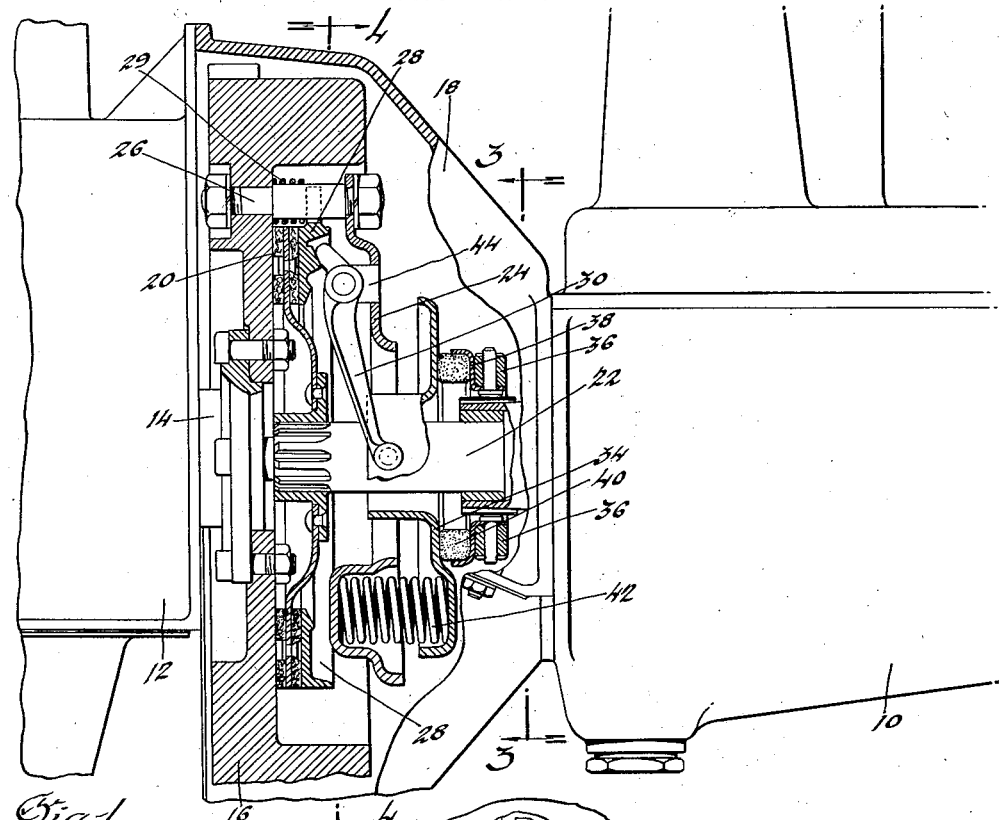
Figure 1 is a side elevation of the transmission, clutch, and part of the engine, broken away to show part of the clutch in vertical section.
Figure 2:
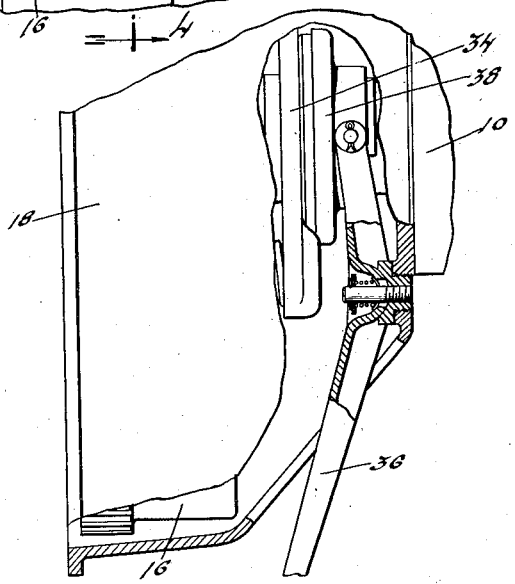
Figure 2 is a top plan view of one side of the clutch, broken away to show the lever operating the clutch release bearing.
Figure 3:
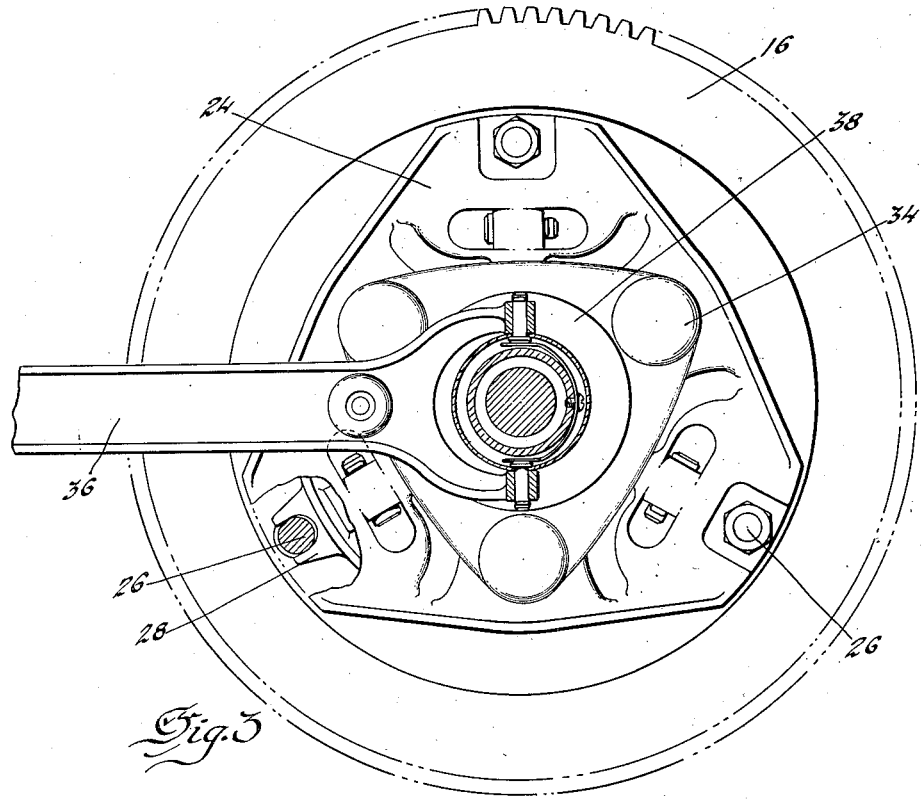
Figure 3 is a vertical transverse section through the clutch on the line 3—3, Figure 1.
Figure 4:
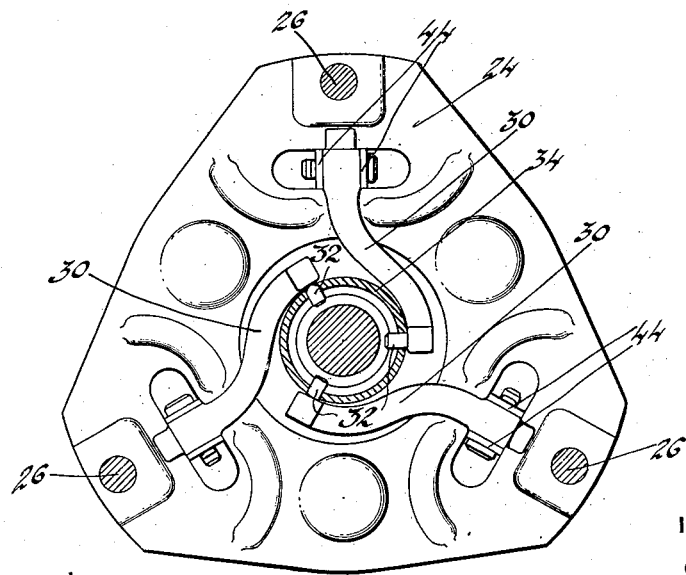
Figure 4 is a vertical transverse section through the clutch on the line 4—4, Figure 1.

The parts shown in Figure 1 include a transmission 10, an engine 12 having a crankshaft 14 with a flywheel 16, and a casing 18 inclosing the flywheel and clutch. The clutch includes a clutch plate 20 splined on a driven shaft 22 extending into the transmission, the clutch plate being arranged to engage frictionally with a surface of the flywheel when the clutch is thrown in. These parts may be of any desired construction.

The flywheel carries a support 24, in the form of a plate or stamping, which rotates with the flywheel and is secured thereto in axially-spaced relation by bolts 26. A clutch ring 28 is keyed on the bolts 26 to rotate with the flywheel, while having axial movement against the resistance of springs 29, the ring having wedge surfaces engaged by three operating levers 30 pivoted on the support 24. Each lever has a pin 32 at its inner end which enters a corresponding opening in a central tubular portion of an operating member 34, on the opposite side of support 24 from the flywheel.

Member 34 is operated, to throw the clutch out, by a lever 36 operated by the clutch pedal (not shown), which lever has a forked inner end pivoted to a clutch release bearing including an annular stamping or housing 38 inclosing a solid ring 40 of graphitic lubricating material, the ring 40 bearing directly against member 34. The clutch is thrown in by three symmetrically arranged springs 42, confined between member 34 and support 24, these parts being provided with sets of oppositely-facing depressions to receive the springs. Levers 30 may be mounted on support 24 by bending down pairs of lugs 44, between each pair of which one of the levers is pivoted.

It will be seen that the above-described arrangement eliminates all need for special supports and mountings for member 34 or its equivalent, in that this member is allowed to float on, and be driven by, springs 42 and levers 30. Thus a couple of stampings 24 and 34 are substituted for a considerable number of parts in the usual clutch.

While one illustrative embodiment has been described, it is not the intention to limit the scope of the invention to that particular embodiment, or otherwise than by the terms of the appended claims.

I claim:

1. A clutch comprising, in combination, a flywheel, a support fixedly secured to the flywheel and axially spaced therefrom, a driven shaft coaxial with the flywheel, a clutch plate driving said shaft and arranged between the flywheel and support, a clutch ring between the plate and support which rotates with the flywheel but is axially movable, levers engaging the support and clutch ring to force the ring and clutch plate toward the flywheel to throw in the clutch, an axially-movable member operatively engaging the ends of the levers, a pedal-operated clutch release bearing engaging said member to force it in a direction to throw the clutch out when the pedal is depressed, and a plurality of symmetrically-arranged springs confined between the support and axially-movable member and urging them apart to throw the clutch in, said springs forming the driving connection between the support and said member.

2. A clutch comprising, in combination, a flywheel, a support fixedly secured to the flywheel and axially spaced therefrom, a driven shaft coaxial with the flywheel, a clutch plate driving said shaft and arranged between the flywheel and support, a clutch ring between the plate and support which rotates with the flywheel but is axially movable, levers engaging the support and clutch ring to force the ring and clutch plate toward the flywheel to throw in the clutch, an axially-movable member operatively engaging the ends of the levers and arranged on the opposite side of the support from the flywheel, a pedal-operated clutch release bearing engaging said member to force it toward the support to throw the clutch out when the pedal is depressed, the support and said member having oppositely-facing depressions, and a plurality of symmetrically-arranged coil springs confined in pairs of said depressions between the support and axially-movable member and urging them apart to throw the clutch in, said springs forming the driving connection between the support and said member.

In testimony whereof I affix my signature.

ALEX TAUB.